3,639,394
PROCESS FOR THE MANUFACTURE OF 14β-HYDROXY-3-OXO-5α-CARD-20(22)-ENOLIDES
Ulrich Stache, Hofheim, Taunus, Werner Fritsch, Neuenhain, Taunus, Werner Haede, Hofheim, Taunus, and Kurt Radscheit, Kelkheim, Taunus, Germany, assignors to Farbwerke Hoechst Aktiengesellschaft vormals Meister Lucius & Bruning, Frankfurt am Main, Germany
No Drawing. Filed June 25, 1969, Ser. No. 836,656
Claims priority, application Germany, July 2, 1968, P 17 68 800.5
Int. Cl. C07c 173/00
U.S. Cl. 260—239.57       1 Claim

ABSTRACT OF THE DISCLOSURE

A 14β-hydroxy-3-oxo-5α-card-20(22)-enolide is prepared by ketalizing a 3-oxo-5α-carda-14,20(22)-dienolide, converting the 3-ketal so obtained with an N-halogenoamide under weakly acid conditions into a 3-ketal of a 3 - oxo - 14β - hydroxy - 15α - bromo - 5α - card - 20(22)-enolide, catalytically hydrogenating this ketal to form the corresponding 3 - oxo - 14β - hydroxy - 5α - card - 20 (22)-enolide, the pH value being between 4.5 and 7, and splitting off the 3-ketal group under weakly acid conditions.

The products of the invention have valuable pharmacological properties.

---

The present invention is concerned with a process for the manufacture of 14β-hydroxy-3-oxo-5α-card-20(22)-enolides.

The present invention provides a process for the manufacture of a 14β-hydroxy-3-oxo-5α-card-20(22)-enolide, wherein a 3-oxo-5α-carda-14,20(22)-dienolide is ketalized, the 3-ketal so obtained is converted with an N-halogeno-amide under weakly acidic conditions into a 3-ketal of a 3-oxo-14β-hydroxy-15α-bromo-5α-card-20(22)-enolide, this ketal is catalytically hydrogenated to form the corresponding 3-oxo-14β-hydroxy-5α-card-20(22)-enolide, the pH value within the range of from 4.5 to 7, and the 3-ketal group is split off under weakly acidic conditions.

The process of the present invention proceeds, for example, according to the following reaction scheme:

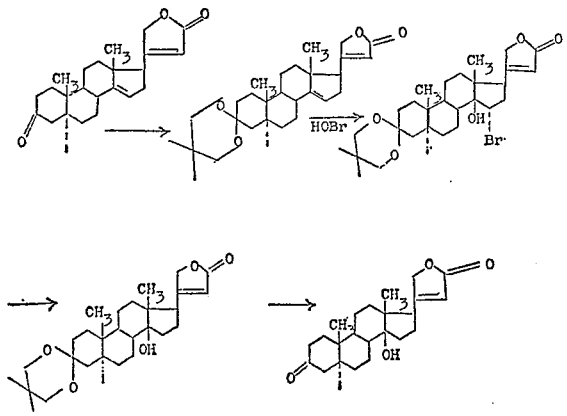

The ketalization of the 3-oxo-5α-carda-14,20(22)-dienolides in the first step of the present process is carried out in the usual manner by reacting it with glycols, preferably by heating it in a water separator with a water entrainer such as, for example, benzene, in the presence of a catalytic amount of an acid, for example p-toluenesulphonic acid. The ketalization may also be carried out by slowly distilling off the glycol used in vacuo at an elevated temperature without using a water entrainer, but also in the presence of a catalytic amount of an acid. The ketals so obtained are then reacted with N-halogenoamides. It is preferably to use N-bromamides, e.g. N-bromocarbonamides such as, for example, N-bromoacetamide or N-bromosuccinimide, or N-bromosulphonamides, preferably those of aromatic sulphonic acids, such as, for example, N,N-dibromobenzene-sulphonamide. The reaction is advantageously carried out in an acetic acid solution in the presence of an inert solvent, such as an ether, for example dioxan, tetrahydrofuran or diethylene glycol dimethyl ether.

Under these conditions the ketal grouping is, surprisingly, not split off. Further purification of the crude halogenhydrins so obtained is unnecessary and they are immediately submitted to hydrogenation. For the selective hydrogenation according to the process of the present invention the reaction medium has to be maintained at a pH value within the range of from 4.5 to 7.

The hydrogenation is carried out by means of catalytically activated hydrogen. As catalysts, noble metals are especially suitable. They are used either in the form of a fine suspension or on a carrier under the usual conditions. Especially advantageous is the use of Raney-nickel activated with a suitable noble metal, for example palladium. It is recommended to free this catalyst from excess alkali by first treating it with a dilute weak acid, for example acetic acid.

By continuously adding a suitable buffer solution, for example, sodium acetate/glacial acetic acid in methanol, the pH value of the reaction mixture is maintained during hydrogenation at 4.5 to 7.0, preferably at 5.5 to 6.5. The hydrogenation comes to a standstill after the absorption of 1 mol-equivalent of hydrogen. As solvents there may be employed those commonly used in hydrogenation reactions, for example low molecular weight alcohols, tetrahydrofuran or dioxan, as well as mixtures thereof.

The ketal splitting effected in the last step of the process of the present invention is carried out in a weakly acidic medium in order to prevent the 14β-hydroxy group from splitting off. It is advatageous to carry out this ketal splitting by heating the compound for about 30 minutes to 1 hour in 70% aqueous acetic acid at a temperature ranging between 90 to 100° C.

The hydrogenation according to the process of the present invention is quite surprising. Because it is known that the 20(22)-double bond in the lactone ring can be hydrogenated at normal pressure and at room temperature, on the one hand by means of Raney-nickel/$H_2$ (see Helv. chim. acta, 24, 716 (1941)), and, on the other hand, by means of palladium/$H_2$ (see J. Biol. Chemistry 54, 253 (1922)), it would not have been expected that bromine could be split off by hydrogenation using catalytically activated hydrogen from the 15-position without attacking this double bond.

The starting material 3-oxo-5α-carda-14,20(22)-dienolide may contain further substituents, for example acyloxy or alkyl groups in the 1-, 2-, 4-, 7-, 11-, 12-, 16-, or 17-position. The dienolide is prepared in the following manner:

First 5α-pregnane-15α,21-diol-3,20-dione (=15α-hydroxy-4,5α-dihydro-cortexone) is prepared by catalytic hydrogenation of Δ$^4$-pregnene-15α,21-diol-3,20-dione (=15α-hydroxy-cortexone) in the presence of a palladium catalyst on a suitable carrier material, for example charcoal, barium sulphate, strontium sulphate or calcium carbonate. 5β-pregnane-15α,21-diol - 3,20 - dione which is simultaneously formed is separated by fractional crystallisation or by chromatography. The 5α-pregnane-15α,21-diol-3,20-dione is then preferably converted into its 15α,21-dimesylate by means of methanesulphonic acid chloride in pyridine. This product is subsequently reacted with the potassium salt of malonic acid benzyl- or -methyl semi-ester in dimethylformamide. The crude 5α-pregnane-15, 21-diol-3, 20 dion-15-mesylate-21-carbobenzoxy- or -21-carbomethoxy-acetate obtained is refluxed without further purification in collidine to which a small amount of water-containing p-toluene-sulphonic acid is advantageously added during the reaction. This reaction yields 3-oxo-5α-carda-14,20(22)-dienolide.

The products of the invention have valuable pharmacological properties, for example they possess, in addition to an inotropic and cardiovascular action, a diuretic effect and especially a specifically antispasmodic action on the unstriated muscles. They can be used as intermediates for the preparation of medicaments; for example uzarigenone obtained according to the invention can be converted by reduction into the known uzarigenine, the 3α-glycosides of which are valuable medicaments for the treatment of spasms, diarrheae, and tenesmi because of their low positive inotropic action and their specifically antispasmodic action on the unstriated muscles.

The following examples serve to illustrate the invention.

EXAMPLE (a) Neopentyl-ketal of 3-oxo-5α-carda-14,20(22)-dienolide

A solution of 3 g. of 3-oxo-5α-carda-14,20(22)-dienolide, 1.3 g. of neopentylglycol and 70 mg. of p-toluene-sulphonic acid in 25 ml. of benzene was refluxed for 2 hours using a water separator. After cooling, the reaction mixture was poured into an excess of sodium bicarbonate/water, methylene chloride was added, the organic phase was separated and washed with water containing pyridine. The solvent was distilled off and the residue was recrystallised from methylene chloride/ether. 2.65 g. of 3-(22-dimethyl-1,3-propanedioxy)-5α-carda - 14,20(22) - dienolide were obtained having a melting point of 200–202° C.

(b) 3-(2,2-dimethyl-1,3-propanedioxy)-15α-bromo-14β-hydroxy-5α-card-20(22)-enolide 1.2 g. of the 3-(2,2 - dimethyl-1,3-propanedioxy)-5α-carda-14,20(22)-dienolide obtained were dissolved in 33 ml. of dioxane and at 10° C. a mixture of 0.78 ml. of glacial acetic acid and 6.5 ml. of water was added to the solution. Then 445 mg. of N,N-dibromobenzene-sulphonamide were added thereto at 0° C. and the clear solution obtained was stirred for 1 hour at 0° C. Subsequently the reaction mixture was poured into 150 ml. of water containing a small amount of sodium bisulphite. The precipitated crystals were separated by filtration, washed and dried. 1.42 g. of 3-(2,2-dimethyl-1,3-propanedioxy)-15α-bromo-14β-hydroxy - 5α - card-20(22)-enolide were obtained having a melting point of about 180° C. Beilstein test strongly positive.

(c) 3-(2,2-dimethyl-1,3-propanedioxy)-14β-hydroxy-5α-card-20(22)-enolide

A solution of 1.21 g. of the 3-(2,2-dimethyl-1,3-propanedioxy)-15α-bromo-14β-hydroxy - 5 - card-20(22)-enolide obtained according to (b) in 10 ml. of methylene chloride and 20 ml. of methanol was added to a previously hydrogenated suspension of a mixed catalyst of 4.2 g. of Raney-nickel and 420 mg. of palladium-(II) chloride in 40 ml. of methanol and 1 ml. of water. The catalytic hydrogenation was effected while simultaneously maintaining the pH of the reaction mixture between 6.0 and 6.6 by continuously adding dropwise a solution of 4.62 g. of sodium acetate containing water of crystallization in 4 ml. of glacial acetic acid and 23 ml. of methanol. After about 5 hours, one mol-equivalent of hydrogen was consumed and the hydrogenation had come to a standstill. The catalyst was subsequently separated by filtration, the filtrate was concentrated in vacuo, the crystalline residue was digested with water and dried. The crystallized crude material was chromatographed in a column containing $Al_2O_3$, Woelm, neutral, level of activity II, (height=10 cm., diameter=2 cm.). The material was first eluated with 400 ml. of benzene and then with 450 ml. of methylene chloride. After evaporating the solvent, the methylene chloride eluate yielded 870 mg. of a crystalline residue which was recrystallised from methylene chloride/ether. 551 mg. were obtained of a product having a melting point of 203–205° C. Typical infrared bands: 3,500, 1,780, 1,730–1,740, 1,610, 1,100 cm.$^{-1}$.

The catalyst used for the hydrogenation was prepared as follows: A solution of 4.2 g. of Raney-nickel in 20 ml. of water was stirred for 5 minutes. The water was decanted and the residue was subsequently suspended in 50 ml. of water. A solution of 420 mg. of palladium dichloride in 100 ml. of water and 1.0 ml. of concentrated hydrochloric acid was gradually added to the stirred suspension, whereby the pH value was not allowed to fall below 3.1. The catalyst was suction-filtered, carefully washed with water and treated by stirring it three times with methanol and subsequently decanting it.

(d) Uzarigenone

A solution of 740 mg. of 3-(2,2-dimethyl-1,3-propanedioxy)-14β-hydroxy-5α-card-20(22)-enolide obtained according to (c) in 6.6 ml. of glacial acetic acid and 2.8 ml. of water was heated for 40 minutes on the steam bath under a nitrogen atmosphere. After cooling, the reaction mixture was poured into an excess of sodium bicarbonate/water and the precipitated crystals were filtered. 510 mg. of of crude uzarigenone were obtained having a melting point of 232–241° C. After recrystallisation from ethylene chloride/ether it melted at 271–274° C.

Typical infrared band: 3,500, 1,775, 1,740–1,720, 1,700–1,710, 1,610 cm.$^{-1}$. UV:λmax.=216–217 mμ, =18,100; $[α]_D^{20°}$=+33.8° ($CHCl_3$)

Preparation of the starting compound:

(α) 15 α-hydroxy-4,5α-dihydro-cortexone 25 g. of pure 15α-hydroxy-cortexone were hydrogenated at room temperature, while vigorously shaking, in 500 ml. of tetrahydrofurane and 550 ml. of methanol in the presence of 12 g. of a hydrogenated 10%-palladium catalyst supported on $CaCO_3$. After 40 minutes 1,510 ml. of hydrogen were consumed and the hydrogenation came to a standstill. The catalyst was separated by filtration, the solvent was evaporated and the oil obtained was dissolved in hot methanol. After cooling and scratching, a crystalline product precipitated which, after recrystallisation from methylene chloride/methanol, yielded 10.5 g. of 15 α-hydroxy-4,5-dihydro-5α-cortexone, melting point 215–216° C.

(β) 3-oxo-5α-carda-14,20(22)-dienolide 15 ml. of methanesulphonic acid chloride were added dropwise at 0° C. to a solution of 8.5 g. of 15α-hydroxy-4,5α-dihydro-cortexone in 100 ml. of acetone and 60 ml. of pyridine and the mixture was stirred for 5 hours at this temperature. The reaction mixture was then poured into 1 l. of water, whereupon the dimesylate crystallised slowly. After filtration the crystalline product was carefully washed with water and dried. The crude 5α-pregnane-15α,21-diol-3,20-dione-15,21-dimethylsylate (8.5 g.) thus obtained was reacted in the following manner without further purification:

55 ml. of dimethylformamide and 7.5 g. of the potassium salt of malonic acid monoethyl ester were added to the dimesylate and the mixture was heated under a nitrogen atmosphere for one and a half hours at 25–50° C. and for 3 hours at 55–58° C. The reaction mixture was then poured into 500 ml. of water, the crystalline precipitate was filtered, washed with water and dried. The crude 5α-pregnane-15α,21-diol - 3,20 - dione - 15 - mesylate-21-carbethoxy-acetate (7.4 g.) thus obtained was dissolved in 80 ml. of collidine without further treatment and allowed to stand for 1 hour at 20° C. After adding 8 drops of water and 20 g. of p-toluenesulphonic acid, the reaction mixture was refluxed at 205° C. for 2 hours under a nitrogen atmosphere which resulted in vigorous formation of carbon dioxide. The reaction mixture was subsequently poured into 500 ml. of 1 N-hydrochloric acid and the brown crystalline precipitate was filtered, washed and dried. The crude crystalline product was then chromatographed on a column containing silica gel (height=6 cm., diameter=2 cm.). After a total throughput of 3 l. of benzene, 1 l. of benzene/methylene chloride 1:1, 1 l. of benzene/methylene chloride 1:4 and 2 l. of methylene chloride, 4.6 g. of crystalline 3-oxo-5α-carda-14,20(22)-dienolide were obtained after evaporation of the solvent. The compound after recrystallisation from ether/methanol, had a melting point of 259–260° C.

Typical infrared bands: 1,775, 1,740, 1700, 1,620 cm.$^{-1}$ $[\alpha]_D^{20°} = +6°$ (CHCl$_3$).

If the crude product was directly recrystallised from methanol/methylene chloride, instead of chromatographed, the same reaction product was obtained with $[\alpha]_D^{20°} = +4°$ (CHCl$_3$).

What we claim is:

1. A method for making 14β-hydroxy-3-oxo-5α-card-20(22)-enolide which comprises ketalising 3-oxo-5α-carda-14,20(22)-dienolide, converting the 3-ketal so obtained into the 3-ketal of 3-oxo-14β-hydroxy-15α-bromo-5α-card-20(22)-enolide with N-halogenoamide under weakly acid conditions, catalytically hydrogenating the latter ketal at a pH from 4.5 to 7 to form the corresponding 3-oxo-14β-hydroxy-5α-card-20(22)-enolide, and cleaving the ketal group by hydrolysis under weakly acidic conditions.

No references cited.

HENRY A. FRENCH, Primary Examiner